United States Patent [19]
Volz

[11] Patent Number: 4,578,406
[45] Date of Patent: Mar. 25, 1986

[54] CONDUCTIVE POLYURETHANE FOAM AND PROCESS OF CONTACTING A POLYURETHANE FOAM WITH A MIXTURE OF SWELLING AGENT AND CHEMICAL ADDITIVE

[75] Inventor: Robert A. Volz, West Chester, Pa.

[73] Assignee: Scotfoam Corporation, Eddystone, Pa.

[21] Appl. No.: 684,012

[22] Filed: Dec. 20, 1984

[51] Int. Cl.$^4$ ............................................. C08G 18/14
[52] U.S. Cl. ..................................... 521/52; 244/1 A; 244/135 R; 280/5 A; 521/54; 521/55
[58] Field of Search ............................. 521/52, 54, 55; 280/5 A; 244/1 A, 135 R

[56] References Cited

U.S. PATENT DOCUMENTS

| | | |
|---|---|---|
| 3,442,692 | 5/1969 | Gaiser . |
| 3,536,260 | 10/1970 | Volz . |
| 3,635,652 | 1/1972 | Streck .................................. 521/55 |
| 3,696,034 | 10/1972 | Hewitt et al. . |
| 3,787,279 | 1/1974 | Winchester ...................... 244/135 R |
| 3,799,898 | 3/1974 | Lamplugh et al. . |
| 3,843,395 | 10/1974 | Morton et al. . |
| 3,870,145 | 3/1975 | Mizuno . |
| 3,944,694 | 3/1976 | McQueary . |
| 4,012,540 | 3/1977 | McQueary . |
| 4,301,040 | 11/1981 | Berbeco ................................ 521/55 |
| 4,303,755 | 12/1981 | Yukuta et al. . |
| 4,522,889 | 6/1985 | Ebneth et al. ....................... 244/1 A |

Primary Examiner—Maurice J. Welsh
Attorney, Agent, or Firm—Connolly and Hutz

[57] ABSTRACT

Polyurethane foam is modified by a post-treatment process comprising the steps of contacting the polyurethane foam with a swelling agent for the polyurethane foam and interpenetrating the swollen foam with a chemical additive, then shrinking the interpenetrated foam by removing the swelling agent under conditions where the chemical additive remains trapped in the polymeric structure of the foam.

22 Claims, No Drawings

CONDUCTIVE POLYURETHANE FOAM AND PROCESS OF CONTACTING A POLYURETHANE FOAM WITH A MIXTURE OF SWELLING AGENT AND CHEMICAL ADDITIVE

BACKGROUND OF THE INVENTION

1. Field of the Invention

This invention relates to a modified polyurethane foam and a post-treatment process for producing the same.

2. Description of the Prior Art

It has long been known that it is not possible to generate an explosion of any fuel/air mixture in the presence of reticulated polyurethane foam structures. Because of this characteristic of reticulated polyurethane foam and the additional benefits of light weight, minimal reduction in a fuel tank's usable space and attenuation of violent surging of fuel, reticulated polyurethane foam structures have found extensive use in military aircraft and land vehicles. These properties reduce the vulnerability of these vehicles by providing protection against explosive ballistic hits, explosions following fuel tank rupture, explosive static discharge and explosions causes by lightning.

Unfortunately, the use of foam can give rise to a different danger. Since the foam has a low electrical conductivity, (or as as more conveniently measured, a high electrical resistivity) then there can be a buildup of electrostatic charges and the electrostatic charges can result in sparking, leading to a fire or explosion within the non-foam containing areas of the fuel tank. The build up of electrostatic charges can also adversely effect sensitive aircraft instrumentation.

Consequently, it is an object of this invention to provide a foam for fuel tanks which minimizes the possibility of fuel explosion from gunfire, electric ignition and lightning. It is a further object of this invention to provide a foam which has a higher electrical conductivity needed to minimize the danger of sparking caused by the buildup of electrostatic charges. It is a further object of this invention to provide fuel tanks which minimize the release of fuel in the event of rupture and which resist sparking due to the buildup of electrostatic charge.

It is also an object of this invention to provide a process for the modification of the properties of a polyurethane foam.

One process for the modification of polyurethane foam is treating the foam with a chemical additive so that the chemical additive coats the surface of a foam. Such processes typically involve spraying, padding or melting material onto polyurethane foam. The disadvantages of adapting such a process to the formation of foam for use in fuel tanks include the tendency of the chemical additive to either flake off the foam into the fuel, thus providing particles which can lead to fuel line blockage or an increased chance of a fire or to leach out of the foam and become dissolved in the fuel.

A second process for the modification of polyurethane foam is incorporating a chemical additive into the polymer itself by the so-called in situ technique. Incorporation can be achieved "in situ" by mixing a chemical additive with polyurethane foam-forming reactants. The chemical additive is mixed with the foam-forming reactants during the reaction, and consequently the chemical additive becomes intimately mixed with the subsequently formed polymer.

The disadvantages of in situ incorporation include the possibility that the desired chemical additive, or a carrier for the chemical additive, will react with the polyurethane foam-forming reactants to adversely effect either the chemical additive itself, the properties of the subsequently formed foam, or the processing of the foam. This generally limits both the nature and the amount of chemical additive that can be incorporated into the polyurethane foam. Another disadvantage is that in situ impregnation is not useful with a volatile or heat-sensitive chemical additive, for the heat of the urethane polymerization reaction will degrade the additive or will volatilize and drive the additive out of the foam-forming mixture.

Consequently, it is an object of this invention to provide a process for the modification of polyurethane foam by interpenetrating the foam with a chemical additive after it has been formed. It is a further object of this invention to provide a process for increasing the electrical conductivity of the polyurethane foam by interpenetrating the foam with a suitable chemical additive after it has been formed.

SUMMARY OF THE INVENTION

The present invention relates to a process for post-treating polyurethane foam to impart thereto desired properties and the modified foam so formed. The post-treatment process comprises the steps of contacting the polyurethane foam with a swelling agent for the polymer and interpenetrating the swollen foam with a chemical additive selected to impart desired properties to the foam, then shrinking the interpenetrated foam by removing the swelling agent under conditions where the chemical additive remains trapped in the polymeric structure of the foam.

DETAILED DESCRIPTION OF THE PREFERRED EMBODIMENTS

The method of this invention is generally useful with conventional reticulated and non-reticulated polyurethane foam. Conventional polyurethane foams include all foams formed from polymers containing a polyurethane linkage. Reticulated foams are preferred. Representative polymers include polyether based polyurethanes, polyester based polyurethanes, copolymer polyol based polyurethanes, and mixtures thereof. Polyether based polyurethanes are preferred in those embodiments where hydrolytic stability is required. Additionally, in preferred embodiments, the polyurethane foam has a void volume greater than 80%, most preferably a void volume greater than 90%.

The interpenetrated polyurethane foams of this invention are produced by treating the foam with a swelling agent which serves to both swell the foam and in some embodiments to transport an interpenetrating chemical additive into the foam. Upon removal of the swelling agent, the chemical additive remains trapped in the polymeric structure of the foam and imparts desired modified properties to the foam.

A wide variety of swelling agents can be employed in this invention. Some requirements of the agents are that the swelling agent must totally or partially dissolve the chemical additive, must swell the foam and must have no adverse affect on the properties of the polyurethane foam or the chemical additive. For example, the swelling agent must swell the foam without dissolving it.

Further, the swelling agent should be easily removable from the foam after the swelling and impregnation steps, so that upon removal, the chemical additive remains trapped in the polymer structure of the foam.

Agents which swell polymers are known. Representative swelling agents include: aliphatic, aromatic and halogenated hydrocarbons, ketones, aldehydes, alcohols, esters, ethers having from one to twenty-five carbon atoms and mixtures thereof. Preferred swelling agents include acetone, aniline, benezene, carbon tetrachloride, cyclohexane, ethyl acetate, ethyl chloride, methanol, ethanol, isopropanol, methylene chloride, chloroform, perchloroethylene, methyl ethyl ketone, nitrobenzene, xylene, trichloroethylene, vinyl acetate, acetaldehyde, diethyl ether, freon and mixtures thereof. Additional swelling agents include sulfur solvents such as dimethylsulfoxide, thioethers and mercaptans; amides such as dimethylformadide; isocyanates; and ethylene glycol monomethyl ether. Most preferred swelling agents include methanol, methylene chloride and trichloroethylene.

Moreover, the swelling agent can be mixed with other fluids, such as water, so long as the resulting mixture has the ability to swell the foam.

Without being limited to the following theory concerning the effect of the swelling agent, it is believed that the swelling agent does more than provide a medium for contacting the chemical additive to the exterior surface of the foam or the cellular voids therein. It is believed that the swelling agent swells the polymeric strands which comprise the foam, substantially throughout the entirety of the foam, thereby permitting the chemical additive to become both more intimately mixed in the polymer and intimately mixed with more of the foam than is possible when the chemical additive is sprayed, padded or melted onto polymeric foam.

The chemical additive is selected to impart certain desired properties to the foam.

Representative additives include flavors, fragrances, colorants, fire retardants, materials which cause intumescence on exposure to flames, smoke retardation materials, wettants, surfactants, detergents, hydrophilic agents, hydrophobic agents, humectants, emolients, permanent wave materials, cosmetics, nutrients, medicinals (vaporizers, antibiotics, etc.), biocides (fungicide, bacteriocide, microbicide, etc.), bacteriostats, contraceptive agents (spermicides), antiseptics, enzymes, repellants (animal, insect, etc.), cleaning agents and modifiers of electrical properties. Further, the chemical additive is any compound which does not exert an adverse effect on the foam and is soluble in or miscible in the swelling agent for a sufficient time to be interpenetrated in the polymer. In certain embodiments, the chemical additive is chosen so that it will provide a long-lasting or permanent modification of the foam. In these embodiments, the chemical additive should be compatible with the polymer, i.e. it must not leach out over time or conditions of use. In other embodiments, the chemical additive is chosen so that it will be controllably released over time. In these embodiments, the chemical additive may have only limited compatability with the polymer.

Representative chemical additives include: inorganic salts, Werner complexes, such as chrome complex with methacrylate, coordination complexes, such as nickel chloride hexahydrate, ethoxylated alkylamines, fire retardants, such as chlorinated phosphate esters, organo titanates, polar organic compounds, anionic and nonionic surfactants, such as ethoxylated alkylphenols and alkoxylated diamines.

In certain embodiments, the additives are quaternary salts and include quaternary ammonium compounds, such as monoalkyl trimethyl quaternaries, dialkyl dimethyl quaternaries, trialkyl monomethyl quaternaries, methyldialkoxy alkyl quaternaries, hydroxy alkylene quaternaries, dimethyl alkyl benzyl quaternaries, complex diquaternaries and tetra alkyl ammonium ethyl sulfate; imidazolinium quaternaries; and quaternary ammonium based copolymers. Where the expression alkyl, alkoxy or alkylene appears, it should be understood that the hydrocarbon chain contains 1-25 carbon atoms.

Representative quaternary ammonium compounds include: methylpolyoxyethylene(15) cocoammonium chloride, methylpolyoxyethylene(15) decylammonium chloride, ethyl bis(polyhydroxyethyl) alkyl ammonium ethyl sulfate, [(3-lauramidopropyl) trimethylammonium] methyl sulfate, stearamidopropyldimethyl-B-hydroxyethyl ammonium nitrate. Representative imidazolinium quaternaries include methyl-1-oleyl amido ethyl-2-oleyl imidazolinium-methyl sulfate and monoalkyl imidazolium ethyl sulfate. Representative quaternary ammonium based copolymers include dimethyl dialkyl ammonium chloride diacetone acrylamide copolymer.

Where the desired modification is an improvement in electrical conductivity, the preferred chemical additives are quaternary ammonium compounds such as ethyl bis(polyhydroxyethyl) alkyl ammonium ethyl sulfate and hydroxy alkylene quaternary ammonium salts; alkoxylated diamines such as N,N,N'-polyoxyethyl(15)-N'-tallow-1,3-propanediamine; and quaternary ammonium based copolymers such as dimethyl dialkyl ammonium chloride diacetone acrylamide.

In the first step of the process of the invention, the polyurethane foam is contacted with a swelling agent. The swelling agent, as discussed above, is a fluid which swells the foam without dissolving it. The agent must swell (i.e., increase the original volume) the foam at least about 10% and preferably from about 20 to about 140%.

The swelling is affected by contacting the foam at a suitable temperature, i.e. from the freezing point to the boiling point of the materials involved for a time sufficient to swell the polymer. The amount of swelling agent must be sufficient to swell the foam the desired amount.

In a preferred embodiment the foam is polyurethane and the swelling agent is premixed with the chemical additive so that the swelling and the interpenetration are carried out contemporaneously. In general, the swelling agent contains from about 0.1 to about 100% and preferably from about 1% to about 100% chemical additive, based on the weight of the mixture. The minimum level of the chemical agent is determined by the minimum amount required to produce the desired modification of the polyurethane foam properties. The maximum level is the amount that is soluble in, miscible in, the swelling agent for a sufficient time to be interpenetrated into the polymeric structure of the polymer.

In other embodiments, a polyurethane foam is swelled with a first swelling agent, then under conditions where there is a transfer of fluid, the first swelling agent is replaced with a second chemical additive containing swelling agent. Similarly, successive swelling agents containing varying chemical additives can be employed where the desired modification requires treatments with successive chemical additives or where one swelling agent cannot be used to interpenetrate two different chemical additives.

Finally, the interpenetrated polyurethane foam is shrunk by removing the swelling agent under conditions such that the chemical additive remains trapped in the polymeric structure of the foam. Representative methods of removal include evaporation, liquid extraction and chemical modification. Chemical modification is a method whereby a second agent is caused to penetrate the polyurethane foam and to react with the first swelling agent thereby causing the polyurethane foam to shrink. In preferred embodiments, the chemical additive is chosen so that it is less volatile than the swelling agent and the removal of the swelling agent is accomplished by evaporation. About 1 to about 50%, preferably from about 3 to about 20% chemical additive, based on the weight of the polymer, remains trapped in the polymeric structure of the polyurethane foam.

The modified foams of the invention are reticulated or non-reticulated polyurethane foams interpenetrated with a chemical additive. The preferred foams also have a void volume greater than 80%, most preferably greater than 90%.

The modified foams contain at least about 1%, preferably about 1 to about 50%, most preferably from about 3 to about 20%, chemical additive, by weight of the foam, trapped therein. In those embodiments having high electrical conductivity, e.g. an electrical resistivity of $1 \times 10^{13}$ ohm-cm or less, the additive is a quaternary ammonium compound, such as ethyl bis(polyhydroxyethyl) alkyl ammonium ethyl sulfate and hydroxy alkylene quaternary ammonium salt; alkoxylated diamines such as N,N,N'-polyoxyethyl(15)-N'-tallow-1,3-propanediamine; and quaternary ammonium based copolymers such as dimethyl dialkyl ammonium chloride diacetone acrylamide and mixtures thereof.

The improved, explosion-resistant fuel tank of the invention is produced from any conventional fuel tank by filling at least from 35% to 100% of the fuel tank interior with a polyurethane foam having an adequately low electrical resistivity. The most preferred foam for fuel tanks is a reticulated polyether based polyurethane. For this purpose, a foam having a resistivity of $1 \times 10^{13}$ ohm-cm or less is required. Such foams are easily produced by the process of this invention using quaternary ammonium compounds as the chemical additive. The fuel tank may be advantageously employed in any vehicle, including land, air and marine vehicular fuel tanks. In preferred embodiments, the fuel tank is an airplane fuel tank.

Having generally outlined the details of the invention, the following, nonlimiting examples provide more specific details to the invention. All amounts are based on parts by weight unless otherwise clearly indicated.

EXAMPLE 1

A 20% solution of CP7091 additive, a dimethyl diallyl ammonium chloride diacetone acrylamide copolymer from Calgon Corporation, in methanol was prepared. A sample of reticulated, 15 pores per inch, 1.3 pounds per cubic foot polyether polyurethane foam was immersed in the solution, allowed to reach its maximum swell of about 56%, and removed. The foam was passed through nip rollers to remove excess solution and to control the amount of CP7091 retained by the foam. The foam was then dried in an oven at 66° C. to evaporate the methanol. Retention level of the chemical additive and resistivity of the treated foam were measured. With a 9.8% additive retention level (by weight of foam) a resistivity of $3.7 \times 10^9$ ohm-cm was observed. This is compared to an untreated foam resistivity of $1 \times 10^{15}$ ohm-cm.

EXAMPLE 2

Example 1 was repeated except a solution of 20% CP7091, 75% water and 5% methanol was used as the chemical additive and swelling. The foam swelled less than 25%. A 11.6% retention level resulted in a resistivity of $7.6 \times 10^{13}$ ohm-cm.

EXAMPLE 3(COMPARATIVE EXAMPLE)

Example 1 was repeated except water, a non-swelling agent, was used instead of a swelling agent. The foam did not swell. While the process resulted in a 9.9% retention level, a resistivity of only $1.9 \times 10^{15}$ ohm-cm was obtained. This resistivity is in the same range as the resistivity of an untreated foam.

EXAMPLE 4

Example 1 was repeated except the foam used was a reticulated, 25 pore per inch, 1.3 pound per cubic foot, polyether, polyurethane foam. A 9.8% retention level resulted in a resistivity of $1.6 \times 10^9$ ohm-cm.

EXAMPLE 5

Example 1 was repeated except the solution was 3.5% Ethoduomeen T/25, a N,N,N'-polyoxyethyl (15)-N'-tallow-1,3-propanediamine supplied by Armak Chemicals, in methylene chloride. The foam was dried at 40° C. A 12.8% retention level resulted in a resistivity of $2.7 \times 10^{11}$ ohm-cm.

EXAMPLE 6

Example 1 was repeated except a 4.8% solution of Varstat 66, a ethylbis (polyhydroxyethyl) alkyl ammonium ethyl sulfate from Sherex Chemical Company, in methylene chloride was used. The foam was dried at 40° C. a 12.8% retention level resulted in a resistivity of $2.7 \times 10^{11}$ ohm-cm.

EXAMPLE 7

Example 1 was repeated except a 6.2% solution of Varstat 55, a mono alkyl imidazolium ethyl sulfate from Sherex Chemical Company, in methylene chloride was used. A 17.8% retention level resulted in a resistivity of $6.7 \times 10^{10}$ ohm-cm.

What is claimed is:

1. A process for modifying the electrical conductivity of a polyurethane foam comprising;
    (a) contacting the polyurethane foam with a mixture of a swelling agent for the polyurethane foam and an electrical conductivity increasing chemical additive, which is soluble or miscible in the swelling agent for a time sufficient to swell the foam to at least a ten percent increase in its original volume and interpenetrate the foam with the chemical additive,
    (b) shrinking the interpenetrated polyurethane foam by removing the swelling agent under conditions whereby at least 1%, by weight of the foam, of the chemical additive remains trapped in the polymeric structure of the polyurethane foam.

2. A process according to claim 1 wherein the swelling agent is an aromatic hydrocarbon, a halogenated hydrocarbon, a ketone, an aldehyde, an alcohol, an ester, an ether or mixtures thereof where the swelling agent contains from one to twenty-five carbon atoms.

3. A process according to claim 1 wherein the swelling agent is acetone, aniline, benzene, carbon tetrachloride, cyclohexane, ethyl acetate, ethyl chloride, methanol, ethanol, isopropanol, methylene chloride, chloroform, perchloroethylene, methyl ethyl ketone, nitrobenzene, xylene, trichloroethylene, vinyl acetate, acetaldehyde, diethyl ether, freon or mixtures thereof.

4. A process according to claim 1 wherein the swelling agent is methanol, methylene chloride or trichloroethylene.

5. A process according to claim 1 wherein the chemical additive is an inorganic salt, a Werner complex, a coordination complex, an ethoxylated alkylamine, a fire retardant, an organo titanate, a polar organic compound, an anionic surfactant, a nonionic surfactant, a quaternary salt, alkoxylated diamines or mixtures thereof.

6. A process according to claim 1 wherein the additive is a quaternary ammonium salt.

7. A process according to claim 6 wherein the quaternary ammonium salt is a quaternary ammonium compound, an imidazolinium quaternary salt, a quaternary ammonium based copolymer, or mixtures thereof.

8. A process according to claim 1 wherein the swelling agent contains from about 0.1 to about 100% chemical additive, based on the weight of the mixture.

9. A process according to claim 1 wherein the swelled polyurethane foam is shrunk after swelling by evaporation, liquid extraction or chemical modification of the swelling agent.

10. A process according to claim 1 wherein the swelled polyurethane foam is shrunk after swelling by evaporation of the swelling agent.

11. A process according to claim 1, wherein the polyurethane foam is a polyether-based, polyester-based copolymer-polyol-based polyurethane foam or mixtures thereof.

12. A process according to claim 11 wherein the polyurethane foam is reticulated.

13. A process according to claim 1 wherein the polyurethane foam is a reticulated polyether-based polyurethane foam.

14. A polyurethane foam having an electrical resistivity of $1 \times 10^{13}$ ohm-cm or less comprising polyurethane foam and at least about 1%, by weight of the polyurethane foam, of an electrical conductivity increasing chemical additive trapped in the polymeric structure of the polyurethane foam, where the chemical additive is soluble or miscible in a swelling agent for the polyurethane foam.

15. A polyurethane foam according to claim 14, wherein the polyurethane foam is a polyether-based, polyester-based, copolymer polyol-based polyurethane foam or mixtures thereof.

16. A polyurethane foam according to claim 14, wherein the polyurethane foam is reticulated.

17. A polyurethane foam according to claim 14 wherein the polyurethane foam is a polyether-based polyurethane foam.

18. A polyurethane foam according to claim 14 wherein the polyurethane foam is a reticulated polyether-based polyurethane foam.

19. A polyurethane foam according to claim 14 having a void volume of at least 90%.

20. An improved fuel tank having an electrical conductivity less than $1 \times 10^{13}$ ohm-cm comprising an outer shell to confine the fuel and having at least 35% of its volume filled with a polyurethane foam prepared by the process comprising;
   (a) contacting a reticulated polyether-based polyurethane foam with a mixture of a swelling agent for the polyurethane foam and an electrical conductivity increasing chemical additive, which is soluble or miscible in the swelling agent, for a time sufficient to swell the foam to at least a ten percent increase in its original volume and interpenetrate the foam with the chemical additive,
   (b) shrinking the interpenetrated polyurethane foam by removing the swelling agent under conditions whereby at least 1%, by weight of the foam, of the chemical additive remains trapped in the polymeric structure of the polyurethane foam.

21. A fuel tank according to claim 20, wherein the fuel tank is a vehicular fuel tank.

22. An improved fuel tank comprising an outer shell to combine fuel and having at least 35% of its volume filled with polyurethane foam, where the polyurethane foam has an electrical resistivity less than $1 \times 10^{13}$ ohm-cm.

* * * * *

UNITED STATES PATENT AND TRADEMARK OFFICE
CERTIFICATE OF CORRECTION

PATENT NO. : 4,578,406

DATED : March 25, 1986

INVENTOR(S) : Robert A. Volz

It is certified that error appears in the above-identified patent and that said Letters Patent is hereby corrected as shown below:

Claim 22, line 43, "combine" should read --confine--.

Signed and Sealed this

Fourteenth Day of March, 1989

Attest:

DONALD J. QUIGG

*Attesting Officer*  *Commissioner of Patents and Trademarks*